United States Patent Office.

BRUNO SCHMIDT, OF HOBOKEN, NEW JERSEY.

Letters Patent No. 76,825, dated April 14, 1868.

---

IMPROVEMENT IN THE PREPARATION OF MANGANATES AND PERMANGANATES.

---

*The Schedule referred to in these Letters Patent and making part of the same.*

---

TO ALL WHOM IT MAY CONCERN:

Be it known that I, BRUNO SCHMIDT, of Hoboken, in the county of Hudson, in the State of New Jersey, have invented a new and useful Improvement in the Preparation of Manganates and Permanganates.

The object of this invention is to prepare from the residuum obtained in the manufacture of chlorine a compound of manganate of soda and chloride of potassium which has superior bleaching qualities.

The residuum, which is obtained in the manufacture of chlorine, and which heretofore has been considered entirely useless and troublesome, is composed of the muriate or sulphate of manganese mixed with the muriate or sulphate of iron, which results from the iron almost invariably contained in the binoxide of manganese ($Mn\ O_2$) used in the manufacture of chlorine.

In carrying out my invention, I subject this residuum to the action of spirit of ammonia until it ceases to produce a yellow precipitate, composed of oxide of iron. As soon as a clear and filtered sample of the liquid, when treated with spirits of ammonia, produces a white precipitate, with a slight tinge of rose color, the oxide of iron is allowed to settle, the clear supernatant liquid is drawn off and treated with spirits of ammonia until it ceases to produce a precipitate. The precipitate is allowed to settle, and the clear liquid, being a mixture of muriate or sulphate of ammonia, is drawn off. The remaining precipitate of manganese is then spread on linen cloth, and, after having been dried, it is heated to a red heat. By the action of the heat all traces of muriate of ammonia are expelled, and the protoxide of manganese ($Mn\ O$) is converted into the red oxide ($Mn_2\ O_3$.) This red oxide of manganese is invariably composed of the same constituents. It is in a state of the most minute division, and entirely free from iron. The oxide of iron, precipitated from the crude solutions of manganese, is used for the production of nitrate or sulphate of iron. The red oxide of manganese, obtained by heating the precipitate of manganese, is used for the production of manganates or permanganates of alkalies, according to the following formula: $2\ (Mn_2\ O_3) + K\ O\ Cl\ O_5 \times Na\ O = 4\ (Na\ O\ Mn\ O_3) \times K\ Cl$; or, in words, two equivalents of the red oxide of manganese are mixed with one equivalent of chlorate of potash and four equivalents of caustic soda, (free from carbonic acid,) from which result four equivalents of manganates of soda mixed with one equivalent of chloride of potassium. This mixture composes the preparation which I use for bleaching.

In order to effect the decomposition, as expressed in the above formula, I take the requisite quantity of caustic soda, dissolve it by heating with the smallest possible quantity of water in a cast-iron kettle. Then I add the chlorate of potash, evaporate the mixture to a thin paste, and incorporate with it the pulverized red oxide of manganese.

The whole mass is then quickly boiled down to a dry state and kept at a dark red heat for about a quarter of an hour. The proportions of the different ingredients in preparing my compound are expressed by weight as follows:

Red oxide of manganese, one hundred and sixty parts.

Caustic soda, (containing sixty per cent. of hydrate of soda,) two hundred and seventy parts.

Chlorate of potash, one hundred and twenty-five parts.

If the process is properly conducted, a compound is obtained, which contains eighty per cent. of manganate of soda, equal to about forty-five per cent. of permanganate of soda, while the manganates, as now prepared, are not equal to more than ten to fifteen per cent. of permanganate of soda or potash.

My compound is of particular value for bleaching fibrous materials of any description, such as textile fabrics of linen, cotton, wool, or silk, and also sheep-skin, hair, and so forth.

Having thus described my invention, what I claim as new, and desire to secure by Letters Patent, is—

1. A compound of manganate of soda and chloride of potassium, prepared substantially as and for the purpose described.

2. The within-described process of treating the residuum obtained in the manufacture of chlorine, substantially as and for the purpose set forth.

BRUNO SCHMIDT.

Witnesses:
W. HAUFF,
E. F. KASTENHUBER.